(12) United States Patent
Randinelli

(10) Patent No.: US 7,465,332 B2
(45) Date of Patent: Dec. 16, 2008

(54) DISPOSABLE GREASE FILTER FOR AIR FILTRATION SYSTEM AND METHOD OF MANUFACTURING SAME

(75) Inventor: Todd Randinelli, Bonita Springs, FL (US)

(73) Assignee: Gemchar, LLC, Ft. Myers, FL (US)

(*) Notice: Subject to any disclaimer, the term of this patent is extended or adjusted under 35 U.S.C. 154(b) by 219 days.

(21) Appl. No.: 11/379,701

(22) Filed: Apr. 21, 2006

(65) Prior Publication Data
US 2007/0245703 A1   Oct. 25, 2007

(51) Int. Cl.
*B01D 46/00* (2006.01)
(52) U.S. Cl. ............... 55/524; 55/528; 55/DIG. 36
(58) Field of Classification Search ............ 55/524, 55/527, 528, DIG. 36
See application file for complete search history.

(56) References Cited

U.S. PATENT DOCUMENTS

| | | | | |
|---|---|---|---|---|
| 1,921,309 | A | * | 8/1933 | Crammond et al. ......... 210/508 |
| 3,056,247 | A | | 10/1962 | Pindzola et al. |
| 3,334,006 | A | * | 8/1967 | Koller .................... 428/88 |
| 4,666,606 | A | | 5/1987 | Heinicke |
| 4,758,460 | A | | 7/1988 | Spicer et al. |
| 5,338,340 | A | | 8/1994 | Kasmark, Jr. et al. |
| 6,235,195 | B1 | | 5/2001 | Tokar |
| 6,293,983 | B1 | | 9/2001 | More |
| 6,306,997 | B1 | * | 10/2001 | Kuo et al. .................... 527/100 |
| 7,387,756 | B2 | * | 6/2008 | Guilbert et al. ............. 264/122 |

OTHER PUBLICATIONS

International Search Report PCT/US07/09678 filed Apr. 20, 2007.
Branz Appraisal Certificate "Woolsorb Disposable Grease Protection System", Branz Limited, New Zealand, Dec. 18, 2003.
Statement of Inventor Joseph Salpietra.

* cited by examiner

*Primary Examiner*—Duane S Smith
*Assistant Examiner*—Robert A Clemente
(74) *Attorney, Agent, or Firm*—Cohen & Grigsby, P.C.

(57) ABSTRACT

An all natural filter assembly without toxic materials for use in an air filtration unit is provided. The filter assembly for use in an air filtration unit includes a support frame and a disposable grease filter disposed across said support frame. The disposable grease filter is formed of wool fiber coated with a bonding agent comprising a natural soy, whey and/or linseed solution. Also provided is a disposable grease filter blanket, which includes a wool fiber woven, non-woven or needle punched blanket coated with a bonding agent of a natural soy, whey and/or linseed solution. The filter blanket can be coated with approximately 0.3 grams to 2.0 grams of bonding agent per square meter of wool fiber.

13 Claims, 4 Drawing Sheets

DISPOSABLE GREASE FILTER FOR AIR FILTRATION SYSTEM AND METHOD OF MANUFACTURING SAME

CROSS-REFERENCE TO RELATED APPLICATIONS

Not Applicable.

FIELD OF THE INVENTION

The present invention relates to kitchen ventilation systems, and more particularly, to disposable grease filters for use with air filtration systems and to methods for manufacturing the filters.

BACKGROUND OF THE INVENTION

Food preparation environments, such as commercial kitchens, can create air laden with greasy cooking vapor that needs to removed with an air extraction unit. In general, commercial kitchens typically include air extraction units adjacent to cooking areas. An air extraction unit creates a vacuum to remove the cooking vapor from the food preparation area. During the removal, the air can be drawn through an air filtration element remove unwanted odors or substances, and in particular grease, from the air so that grease does not accumulate within the air extraction units. The build up of contaminants, such as grease, within the air extraction unit can create a significant fire hazard. U.S. Code requires the inclusion of listed flame baffles in type I ventilation hoods. Although type I flame baffles can filter some grease, they do not filter grease efficiently and are used to prevent open flames from spreading. Thus, type I flame baffles, by themselves, do not provide adequate grease filtering and can result in significant grease buildup.

The air filtration elements often become quickly soiled depending upon conditions of use and require regular cleaning to maintain an efficient filtering action to provide, e.g. clean air in the workplace. If left for a prolonged period, severe clogging of the filter element may occur, reducing airflow, filtering performance and creating unpleasant working conditions. Badly soiled filters can also release trapped contaminants onto food and food processing surfaces beneath the air filter.

Some air filtration elements can include reusable materials, which are able to be cleaned or reconditioned. Other air filtration elements are disposable. Flame baffle filters have also been used. Nevertheless, cleaning air filtration elements can be quite messy, often inconvenient and deposits may be difficult to remove, requiring harsh or even toxic chemicals. If the air filtration elements are ineffective, the air extraction unit should be cleaned, which is an even more difficult undertaking due to restricted access and the typical location of air extraction units over stoves and/or cooking surfaces. In some circumstances, service companies are contracted to routinely clean air extraction units.

Current air filtration units can include various unnatural fibers and chemicals that may be toxic if ingested or inhaled. U.S. Pat. No. 6,293,983 discloses the use of a wool pre-filter for removing grease from the air, that is used in front of a filter. In order to maintain structural integrity of the pre-filter, the wool is homogenously blended with a synthetic polyester mix, which is melted by application of heat to the coated pre-filter so that the polyester coats the fibers of the pre-filter. The use of a synthetic chemical on the pre-filter is a cause for concern, and a potential hazard.

With the air filtration units' close proximity to cooking surfaces, it is possible that air filtration unit particles may become unknowingly embedded within the food being prepared. Still, to further worsen such a concern, heat from cooking surfaces can release noxious gaseous chemicals from chemicals embedded within the air filtration units. Accordingly, an air filtration unit that is devoid of any toxic or potentially toxic chemicals or particles is desired.

SUMMARY

The present invention provides a filter assembly including a disposable grease filter, a disposable grease filter blanket, and a method of manufacturing the same. The disposable grease filter is constructed of all natural materials to provide an all natural solution to prevent grease build up in air extraction systems used in food preparation facilities, such as commercial restaurants.

An all natural filter assembly without toxic materials for use in an air filtration unit is provided in a first embodiment of the invention. The filter assembly for use in an air filtration unit includes a support frame and a disposable grease filter disposed across said support frame. The disposable grease filter is formed of a wool fiber coated with a bonding agent comprising a natural soy, whey and/or linseed solution. The wool fiber can be coated with approximately 0.3 grams to approximately 2.0 grams of bonding agent per square meter of wool fiber and the density of the disposable grease filter can be approximately 65 g/m$^2$ to approximately 145 g/m$^2$, when measured while the grease filter is dry. Still further, the loft of the disposable grease filter can be approximately 5 mm to approximately 13 mm.

An installation tool can be provided. The installation tool can have a handle and a mounting arm with two hook portions disposed at opposite ends of the mounting arm. In another arrangement, an embedded marker can be included in the disposable grease filter, which may become covered by grease during use such that a user is given an indication of when the filter should be replaced. In some arrangements, the support frame can include at least one prong such that the disposable grease filter may be supported on the support frame by piercing the disposable grease filter with the at least one prong. The support frame may also include at least one mounting spike on the rear thereof, such that the disposable grease filter may be at least partially wrapped around the support frame and secured to the at least one mounting spike.

In another embodiment of the invention, a disposable grease filter blanket for use in an air filtration system is provided. The disposable grease filter blanket includes a wool fiber woven, non-woven or needle punched blanket coated with a bonding agent of a natural soy, whey and/or linseed solution. The blanket can be coated with approximately 0.3 grams to approximately 2.0 grams of bonding agent per square meter of wool fiber and the density of the blanket can be approximately 65 g/m$^2$ to approximately 145 g/m$^2$, measured while the blanket is dry. Additionally, the loft of the blanket can be approximately 5 mm to approximately 13 mm. An embedded marker can be included in the blanket, which may become covered by grease during use such that a user is given an indication of when the blanket should be replaced.

A method of manufacturing a disposable grease filter blanket for use in an air filtration system is also provided. The method can include the steps of providing a wool fiber woven, non-woven or needle punched blanket, coating the blanket with a bonding agent comprising a natural soy, whey and/or linseed solution and drying the coated blanket at a temperature of less than 250° F. The method can also include the step of bonding together two or more blankets. The method can further include the step of embedding a marker into the blanket using a natural dye, which could be, for example, vegetable coloring.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE PREFERRED EMBODIMENTS

Figure 1:
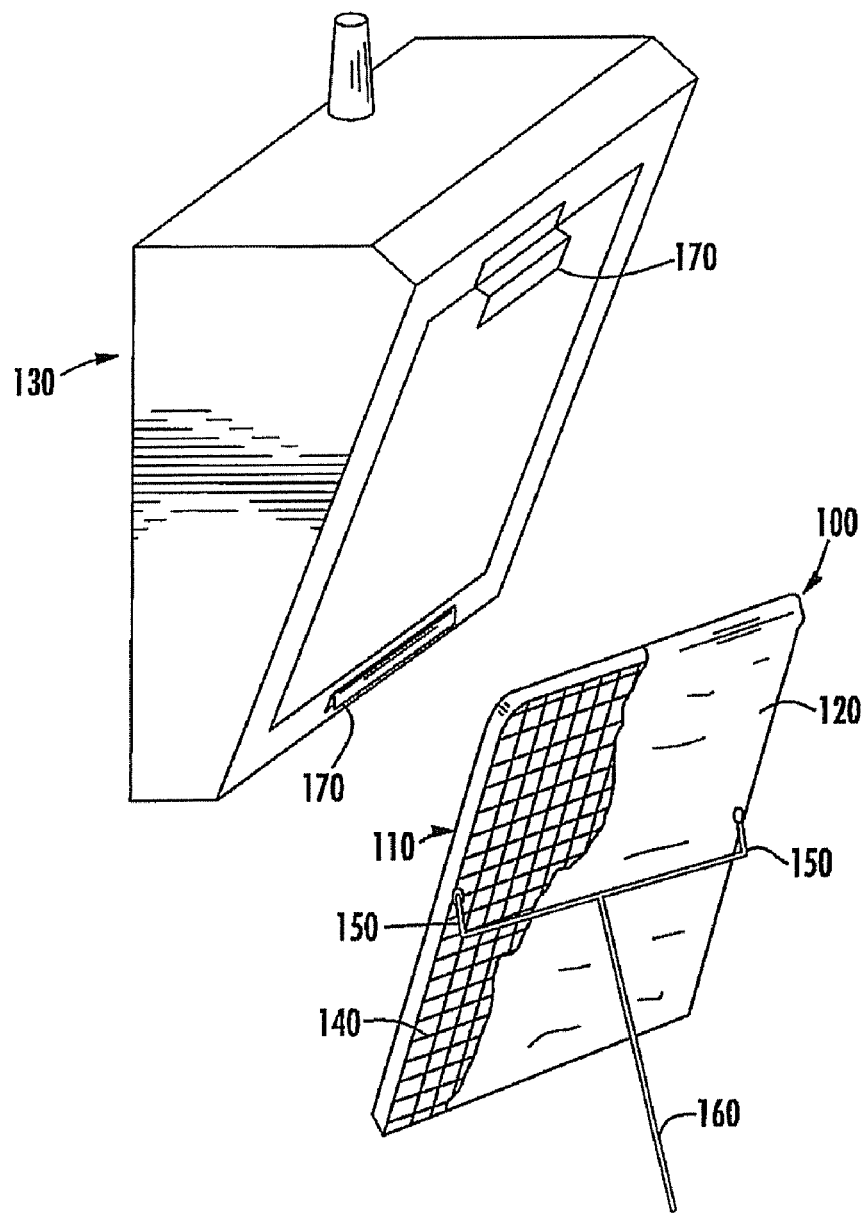
FIG. 1 is a perspective view of a filter assembly and an air filtration system.
Figure 2:
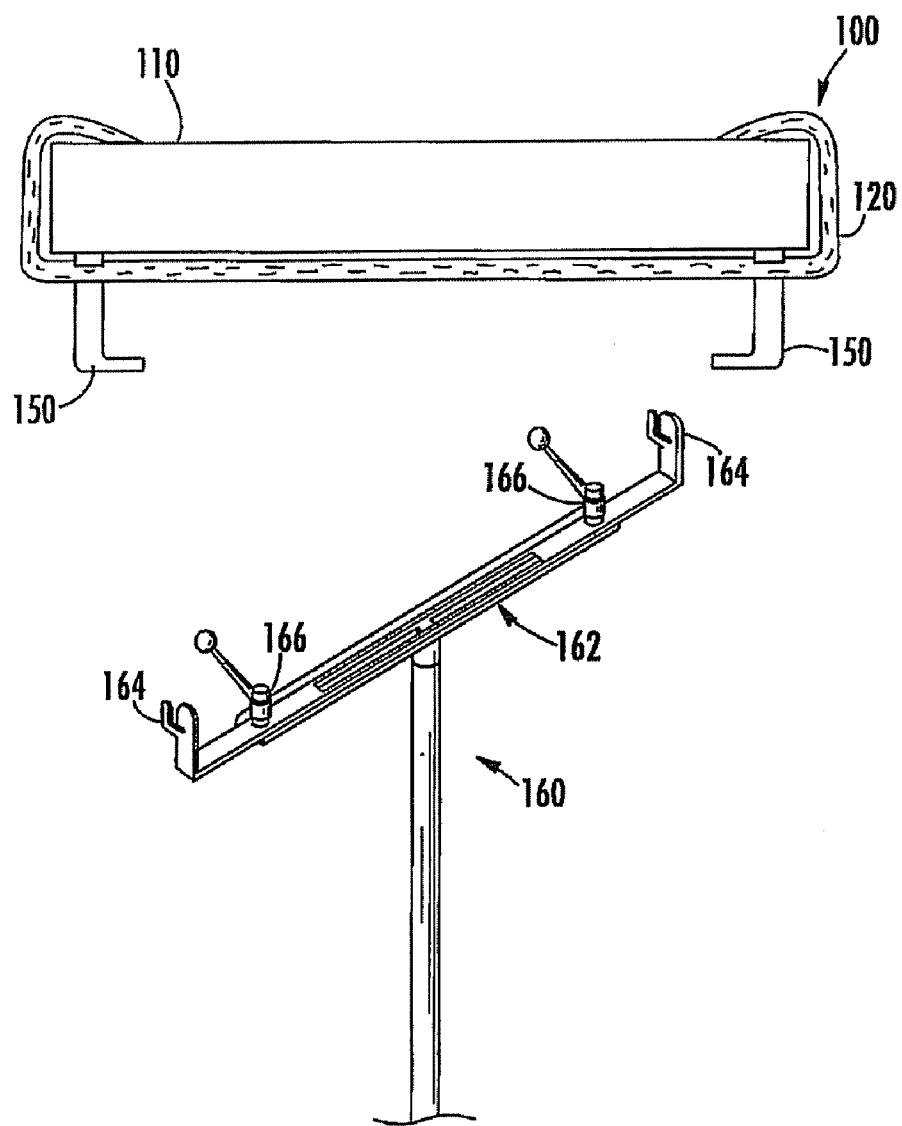
FIG. 2 is a side view of the filter of FIG. 1.

By reference to the exemplary drawings in detail wherein like numerals indicate like elements throughout the various views, there is shown in FIGS. 1 and 2 an exemplary filter assembly 100 for use in an air filtration unit to filter grease in accordance with the invention. The filter assembly 100 can include a support frame 110 and a grease filter 120 disposed across the support frame 110. The filter assembly 100 can be constructed and arranged for use with an exhaust hood 130.

The support frame 110 can be constructed of any material suitable to withstand indirect heat from cooking surfaces, such as aluminum, stainless steel and the like. The support frame 110 can include elongated rods or a mesh 140 that can help to support the grease filter 120. The support frame 110 can also include prongs 150 for use during installation and removal of the support frame 110 from an exhaust hood 130 or other device. In the illustrated arrangement, two prongs 150 are provided, although it will be appreciated that any suitable number and arrangement of prongs may be used.

With reference to FIG. 2, the filter assembly 100 is shown with the grease filter 120 attached to the support frame 110. The prongs 150 pierce through one or more portions of the grease filter 120 to secure the grease filter 120 to the support frame 110. Additionally, it should be noted that the portion of the grease filter 120 that wraps around the periphery of the support frame 110 will allow the filter assembly 100 to snugly fit into position on an exhaust hood 130 or other device, by sandwiching the grease filter 120 between the support frame 110 and exhaust hood 130 or other device. Mounting spikes (not shown) may be provided on the rear of the support frame 110, such that the portion of the grease filter 120 that wraps around the support frame 110 may be pierced with a mounting spike to retain the grease filter 120 securely in position on the support frame 110.

Also shown is an installation tool 160, which can be elongated, for removably hooking to the prongs 150 during installation of the filter assembly 100 and reaching overhead exhaust hoods 130 or other devices. The installation tool 160 can also include mounting arm 162 with hook portions 164 disposed on opposite ends of the mounting arm 162. The mounting arm 162 can include one or more components slidably connected to allow the width of the mounting arm 162 to be changed according to the width of the prongs 150 provided by the support frame 110. The mounting arm 162 can also include a ratcheting device 166 for adjusting the length and holding in a secure arrangement. Other structures, such as wingnut (not shown), can be provided to secure the slidably components of the mounting arm in a fixed arrangement.

During installation and with reference to FIG. 2, the grease filter 120 can be laid on top of the support frame 110, on the same side as the prongs 150. The grease filter 120 can be gently forced such that the prongs 150 pierce through the grease filter 120 and the portions of the grease filter 120 that extend beyond the edges of the support frame 110 and can be wrapped around the edges to the opposite side without need for further securing. The portions of the grease filter 120 that are wrapped around the support frame 110 can be secured to mounting spikes (not shown) on the rear of the support frame 110.

To install the support frame 110 with the grease filter 120 in a aperture such as an exhaust hood, the installation tool 160 can be used to hook onto the prongs 150. With the installation tool 160, mounting arm 162 having hook portions 164 can be hooked to prongs 150 and the filter assembly 100 can be placed in the holding brackets 170 of the exhaust hood 130 or other device. It should be noted that the filter assembly 100 can be used infront of a pre-existing UL 1046 extractor baffle. Additiionally, the installation tool 160 can be elongated to reach elevated exhaust hoods 130, such as those that may be placed high above cooking surfaces.

With the filter assembly 100 placed in the holding brackets 170, the installation tool can be unhooked and stored for later use. The filter assembly 100 can be used without adjustments until grease droplets begin to form on the grease filter 120, at which point the grease filter 120 will likely be saturated with grease. To remove the filter assembly 100, the installation tool 160 can be hooked to the prongs 150 and the filter assembly 100 can be removed from the brackets 170. The saturated grease filter 120 can simply be discarded and replaced. A degreaser can be used on the support frame 110, if needed, prior to attaching an unused grease filter 120.

When installed correctly, the filter assembly 100 creates a seal around the periphery of the exhaust hood, which reduces the accumulation of grease in the duct work. This is at least partly due to the grease filter 120 being wrapped around the support frame 110, thus ensuring a tight fit into the aperture that the filter assembly is installed in. By reducing grease build up in the duct work, fire hazards are greatly reduced, and the amount of time that has to be devoted to cleaning the duct work is also greatly reduced.

Figure 3:
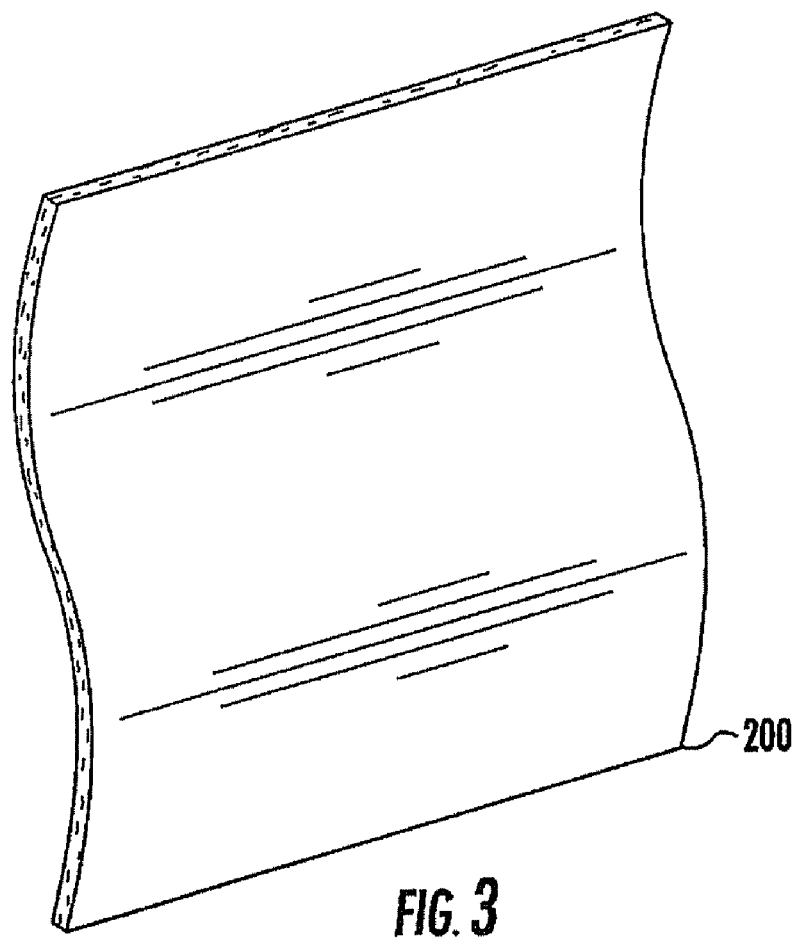
FIG. 3 is a perspective view of the filter of FIG. 1.

With reference to FIG. 3, a blanket 200 is shown in accordance with the inventive arrangements. The blanket 200 can be used as the grease filter 120 shown in FIGS. 1, 2, 5 and 6, and can form a disposable filter. In that regard, the shape or dimensions of the blanket 200 is generally unlimited and the blanket 200 can be made or cut to various shapes to accommodate different exhaust hoods 130 or other devices.

The blanket 200 can be constructed of a fire retardant material that can either withstand indirect, or even direct heat or flame. Alternatively, the blanket 200 can be constructed of material that will substantially disintegrate upon direct flame to prevent spread of any open flame. In one embodiment, the blanket 200 can be constructed of wool. The wool can include wool fibers that can be woven, non-woven or needle punched.

The wool or wool fibers can be coated with various bonding agents, such as liquid bonding agents to increase the tensile strength of the blanket 200. In a preferred embodiment, the bonding agents can be natural liquids, which are naturally occurring in liquid form or derived from natural starting materials, in contrast to chemical agents, which are synthetically produced, such as polyester. Examples of natural bonding agents are solutions of a water based acrylic and soy, whey, linseed or a combination thereof. In one example, a solution of natural bonding agents can be comprised of approximately 30% soy, 30% whey, 30% linseed and 10% water based acrylic. Nevertheless, the solution can also be comprised of approximately 90% soy, whey or linseed and approximately 10% water based acrylic. Other combinations are possible.

Still further, the bonding agents can also be wicking agents to help the grease spread along the blanket 200 instead of concentrating at certain regions. Wicking agents will help move the grease and other moisture along the surface of the blanket's fibers by the capillary action created by the wool fibers. Such spreading of the moisture can help some moisture to evaporate and increase the life of the blanket 200.

Additionally, it should be noted that the bonding agents should not be materials or liquids with a low flash point and should generally be inert to exposure to indirect or direct heat. In this regard, it should also be noted that the bonding agents of whey and/or soy solutions do not include any materials that create noxious or toxic vapor chemicals by exposure to direct or indirect heat, or even when subjected to an open flame. Still further, it should noted that the bonding agents or the blanket can include various natural colorings, such as natural vegetable colorings. Additionally, the blanket can include an embedded marker of a written message, phrase, shape or symbol comprised of vegetable coloring. In use, the user may identify the appropriate time to change the blanket by the extent to which the filtered grease has covered the embedded marker. By way of example, the message may read "clean blanket" when unused. Once the message is unreadable, it can signify the appropriate time to change the blanket.

Once coated with one or more bonding agents, the blanket 200 can include between approximately 0.3 grams and 2.0 grams of bonding agent per square meter of blanket 200. In one example, the blanket 200 can include approximately 1.6 grams of bonding agent per square meter of blanket 200. Other types of bonding agents may allow for a broader range of bonding agent per square meter to be used with the blanket 200.

Also, once coated, the density of the blanket 200 may be altered from its uncoated density, and increases in density can help to provide further filtering capabilities and increase the overall longevity of the blanket 200. In the coated state, the density of the blanket 200 can range from 65 to 145 $g/m^2$. The grease filter can be formed of a single blanket 200, or of two (or more) blankets 200 bonded together. In certain arrangements, each blanket may have a density of, for example, 65-72 $g/m^2$, such that two blankets bonded together may have a combined density of 130-145 $g/m^2$. Still further, the coating of the blanket 200 can alter the loft of the blanket 200 from its uncoated loft. The blanket 200, for use as a grease filter, can have loft in the range of 5 mm-13 mm.

The blanket 200 may also be treated with a mild antimicrobial agent, although wool has natural antimicrobial properties and so the use of an antimicrobial agent is not required. Any suitable antimicrobial agent may be used, and preferably the antimicrobial agent is made from natural ingredients, such as tea tree oil, olive leaf extract, Nisin, grapefruit seed extract, and the like. Alternatively a low concentration of other antimicrobial agents may be used.

Figure 4:
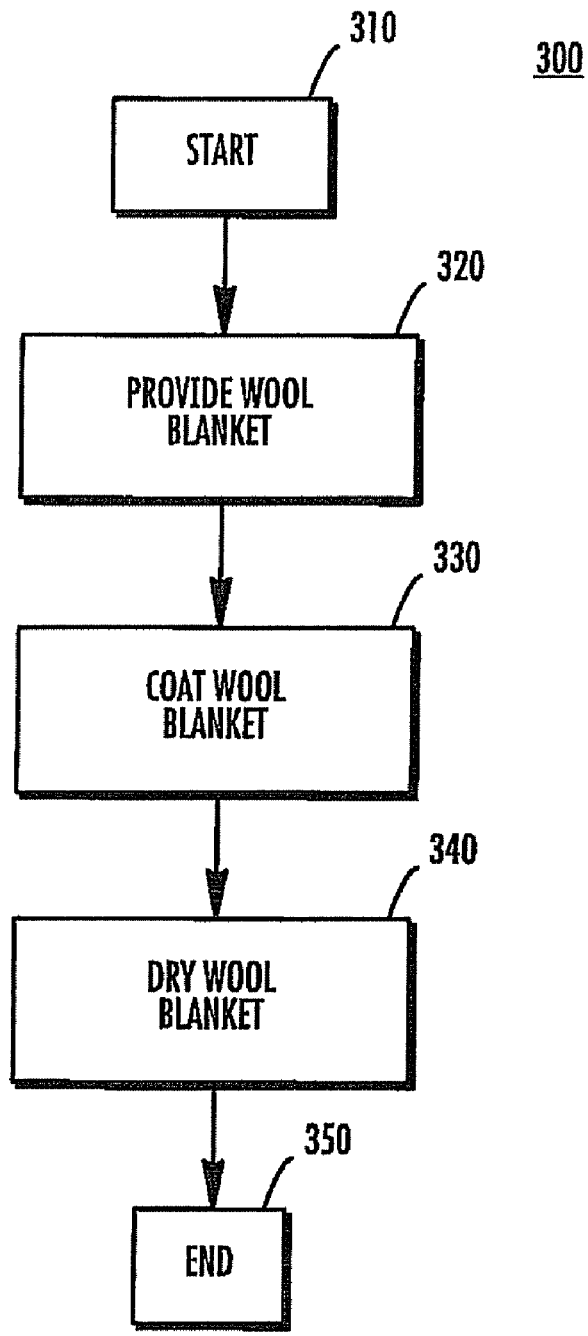
FIG. 4 is a flow chart illustrating a method for manufacturing a filter in accordance with the inventive arrangements.

A flow chart illustrating the process 300 of creating a blanket for a grease filter is shown in FIG. 4. The process 300 can start in step 310. In step 320 a wool blanket can be provided. As noted above, the wool blanket can include wool fibers that can be woven, non-woven or needle punched.

In step 330, the blanket can be coated with a bonding agent. Coating can include spraying the blanket with a bonding agent, such as a whey, soy and/or linseed solution. Although spraying can be used to coat the blanket, other forms of coating, such as soaking, brushing, or the like, are suitable. The antimicrobial agent may be sprayed onto the wool at the same time as the spray bonding.

The blanket can be evenly or unevenly coated in step 330 to distribute the bonding agent across the surface of the blanket or to have concentrations of the bonding agent at certain portions of the blanket. For instance, the blanket can be sprayed in a concentrated manner to provide increased tensile strength to the blanket at those particular portions that may be pierced during installation. Nevertheless, the blanket can be sprayed with bonding agent such that the blanket can include between approximately 0.3 grams and 2.0 grams of bonding agent per square meter of the blanket.

Additionally, steps of the process 300 can be modified as desired. For instance, two blankets can be provided in optional step 320 and can be arranged flat against each other. In the coating step 330, only the outside surfaces can be coated with the bonding agent. Once the outside surfaces are coated, including the edges of the blankets, the two blankets can be bonded together to form a blanket with approximately twice the loft of one single blanket.

In step 340, the blanket can be dried via any suitable process, such as air drying or heating with an infrared or microwave device or with a conventional heated oven. Although the blanket can air dry, the drying can occur at any temperature less than 250° F. Notably, the drying does not occur at a temperature high enough to melt or cook the fibers of the blanket or the bonding agents.

It should be noted that the entire process 300 of creating a blanket that can be used as a grease filter, and the grease filter itself, does not include any unnatural chemicals. Although heat can be used to dry the blanket coated with the bonding agent, the process 300 can also occur without substantial heating of the blanket so as to cause melting. As such, this process provides substantial cost savings as a curing oven or the like is not required.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The invention claimed is:

1. A filter assembly for use in an air filtration unit, comprising:
   a support frame; and
   a disposable grease filter disposed across said support frame,
   wherein said disposable grease filter is formed of a wool fiber coated with a bonding agent comprising a natural soy, whey and/or linseed solution.

2. The filter assembly according to claim 1, wherein the wool fiber is coated with approximately 0.3 grams to approximately 2.0 grams of bonding agent per square meter of wool fiber.

3. The filter assembly according to claim 1, wherein the density of the disposable grease filter is approximately 65 $g/m^2$ to approximately 145 $g/m^2$, measured while the disposable grease filter is dry.

4. The filter assembly according to claim 1, wherein the loft of the disposable grease filter is approximately 5 mm to approximately 13 mm.

5. The filter assembly according to claim 1, further comprising an installation tool having a handle and a mounting arm with two hook portions disposed as opposite ends of the mounting arm.

6. The filter assembly according to claim 1, wherein the disposable grease filter includes an embedded marker that becomes covered with grease in use such that an indication of the need for replacement of the filter is given.

7. The filter assembly according to claim 1, wherein the support frame includes at least one prong such that the disposable grease filter may be supported on the support frame by piercing the disposable grease filter with the at least one prong.

8. The filter assembly according to claim 1, wherein the support frame includes at least one mounting spike on the rear thereof, such that the disposable grease filter may be at least partially wrapped around the support frame and secured to the at least one mounting spike.

9. A disposable grease filter blanket for use in an air filtration system, comprising:
   a wool fiber woven, non-woven or needle punched blanket coated with a bonding agent comprising a natural soy, whey and/or linseed solution.

10. The filter blanket according to claim 9, wherein the blanket is coated with approximately 0.3 grams to approximately 2.0 grams of bonding agent per square meter of wool fiber.

11. The filter blanket according to claim 9, wherein the density of the blanket approximately 65 g/m$^2$ to approximately 145 g/m$^2$, measured when the blanket is dry.

12. The filter blanket according to claim 9, wherein the loft of the blanket is approximately 5 mm to approximately 13 mm.

13. The filter blanket according to claim 9, wherein the blanket includes an embedded marker that becomes covered with grease in use such that an indication of the need for replacement of the blanket is given.

* * * * *